(12) United States Patent
Kawahara et al.

(10) Patent No.: US 9,142,172 B2
(45) Date of Patent: Sep. 22, 2015

(54) LIQUID CRYSTAL DISPLAY DEVICE

(75) Inventors: Norihiro Kawahara, Kawasaki (JP);
Masayuki Abe, Saitama (JP); Masaru Yamamura, Kawasaki (JP); Yuya Kurata, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 19 days.

(21) Appl. No.: 13/414,178

(22) Filed: Mar. 7, 2012

(65) Prior Publication Data

US 2012/0162554 A1 Jun. 28, 2012

Related U.S. Application Data

(63) Continuation of application No. 12/432,613, filed on Apr. 29, 2009, now Pat. No. 8,144,277.

(30) Foreign Application Priority Data

May 2, 2008 (JP) ................................. 2008-120405
May 7, 2008 (JP) ................................. 2008-121163

(51) Int. Cl.
*G02F 1/13* (2006.01)
*G09G 3/36* (2006.01)
*G02F 1/1333* (2006.01)

(52) U.S. Cl.
CPC .. *G09G 3/3611* (2013.01); *G02F 2001/133397* (2013.01)

(58) Field of Classification Search
None
See application file for complete search history.

(56) References Cited

U.S. PATENT DOCUMENTS

| 7,714,947 | B2 | 5/2010 | Verschueren et al. | |
| 8,068,079 | B2 | 11/2011 | Kawahara | |
| 2003/0016328 | A1* | 1/2003 | Chung et al. | 349/149 |
| 2006/0256245 | A1* | 11/2006 | Verschueren et al. | 349/33 |
| 2007/0134883 | A1* | 6/2007 | Lee et al. | 438/398 |
| 2008/0042954 | A1* | 2/2008 | Lee et al. | 345/89 |
| 2008/0309837 | A1 | 12/2008 | Abe | |
| 2009/0102765 | A1* | 4/2009 | Kawahara | 345/87 |

FOREIGN PATENT DOCUMENTS

| JP | 5-323336 A | 12/1993 |
| JP | 8-201830 A | 8/1996 |
| JP | 11-038389 A | 2/1999 |
| JP | 2003-075801 A | 3/2003 |
| JP | 2005-055562 A | 3/2005 |

OTHER PUBLICATIONS

Office Action for Counterpart Japanese Application No. 2008-121163 dated Nov. 13, 2012.

* cited by examiner

*Primary Examiner* — Mike Stahl
(74) *Attorney, Agent, or Firm* — Carter, DeLuca, Farrell & Schmidt, LLP

(57) ABSTRACT

An operation of floating charged particles and an operation of dispersing charged particles in a liquid crystal layer are controlled by determining strengths of electric fields to be applied to a liquid crystal element in accordance with a length of elapsed time from a point turning on the liquid crystal display device.

22 Claims, 13 Drawing Sheets

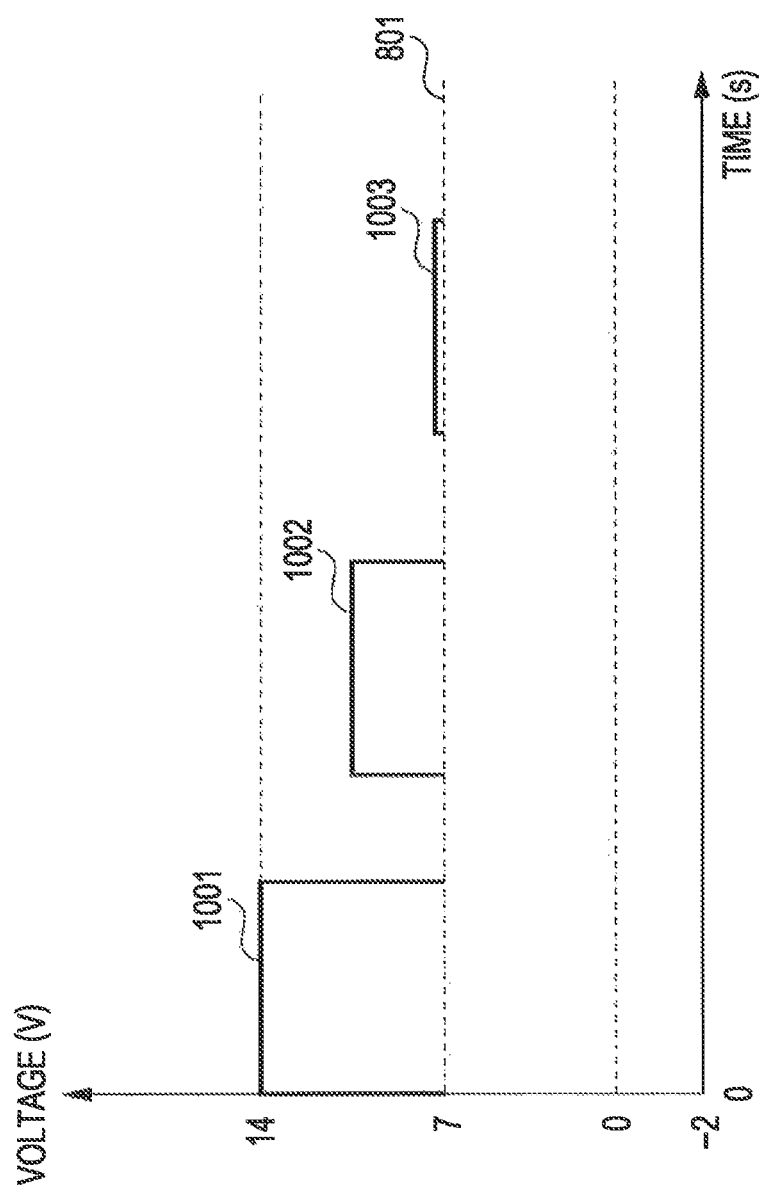

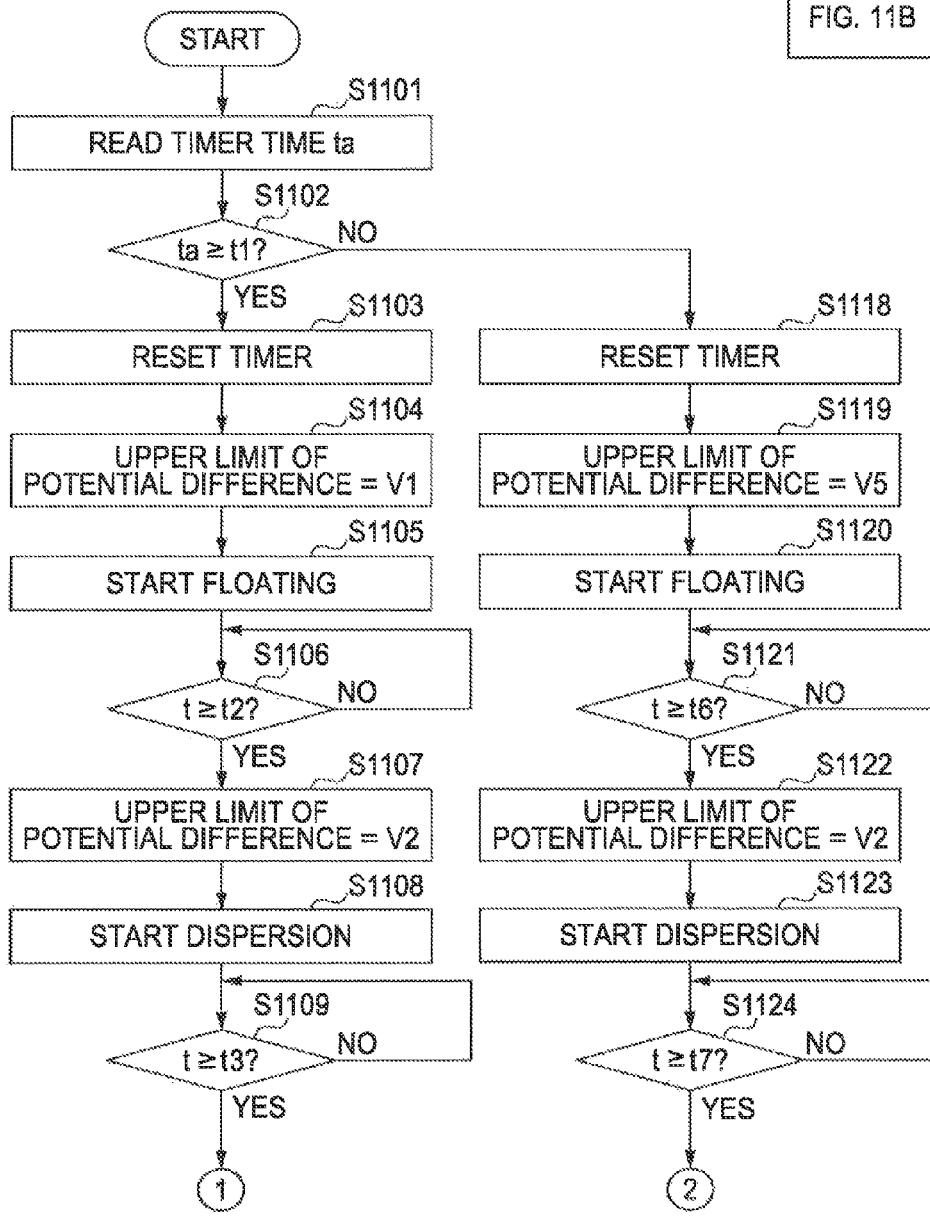

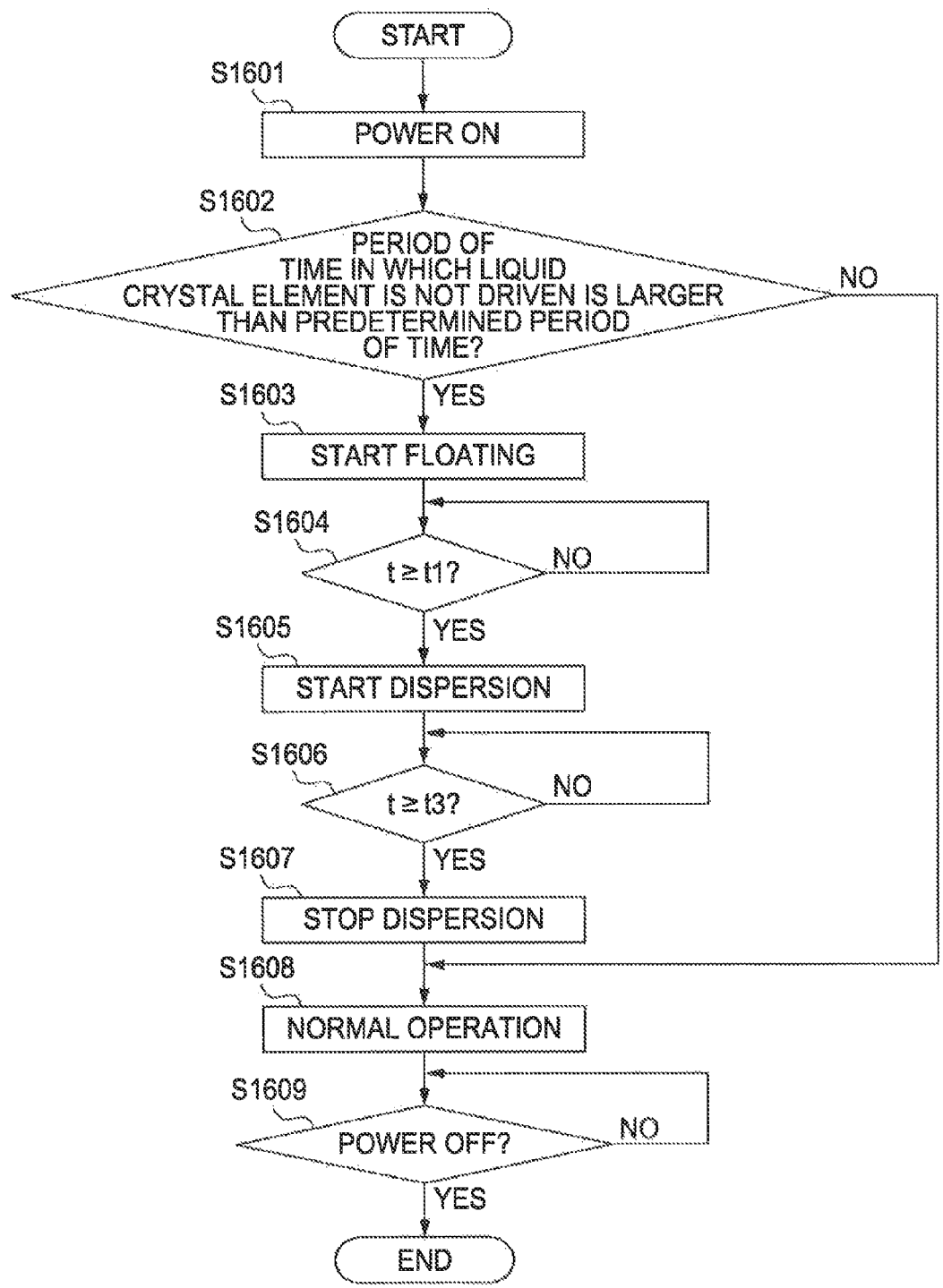

LIQUID CRYSTAL DISPLAY DEVICE

CROSS REFERENCE TO RELATED APPLICATIONS

This application is a continuation of U.S. patent application Ser. No. 12/432,613 filed Apr. 29, 2009, now U.S. Pat. No. 8,144,277, which claims the benefit of and priority from Japanese Patent Application Nos. 2008-120405, filed May 2, 2008 and 2008-121163 filed May 7, 2008, the entire contents of each of which are hereby incorporated by reference in their entirety.

BACKGROUND OF THE INVENTION

1. Field of the Invention

The present invention relates to liquid crystal display devices, and particularly relates to a liquid crystal display device employing a liquid crystal modulation element.

2. Description of the Related Art

In general, liquid crystal projectors and liquid crystal displays are known as examples of a liquid crystal display device employing a liquid crystal element. Such liquid crystal elements employed in liquid crystal display devices include TN (twisted nematic) liquid crystal elements serving as transmissive liquid crystal elements or VAN (vertical alignment nematic) liquid crystal elements serving as reflection liquid crystal elements.

Such a liquid crystal element is configured such that liquid crystal fills a portion between a first transparent substrate having a transparent electrode (common electrode) and a second transparent substrate having transparent electrodes (pixel electrodes), lines, and switching elements, for example, which constitute pixels. The portion including the liquid crystal is particularly referred to as a liquid crystal layer.

The liquid crystal element is used to form an image by controlling a polarization state of light which is transmitted through the liquid crystal. This is carried out by making use of a characteristic in which an electric field is generated in the liquid crystal layer by controlling voltages between electrodes of the liquid crystal element so that an alignment direction of liquid crystal molecules is changed and the polarization state of the light transmitted through the liquid crystal is changed.

However, charged particles are included in the liquid crystal layer and an outer-wall member surrounding the liquid crystal layer, for example. When the liquid crystal is driven in a high-temperature environment, in particular, the charged particles drift (move). The charged particles serving as direct-current electric-field components in the liquid crystal layer are attached to an alignment layer or an electrode interface of a liquid crystal layer interface, and the charged particles drift and are deposited along the alignment direction of the liquid crystal molecules.

Furthermore, in liquid crystal elements having organic alignment layers, when the liquid crystal is driven in a high-temperature environment, in addition to drift of charged particles, charged particles are newly generated since organic members such as an alignment layer, liquid crystal, and a seal member are broken down due to light which is incident onto the liquid crystal elements. These charged particles also serve as direct-current electric-field components in a liquid crystal layer, are attached to an alignment layer or an electrode interface of a liquid crystal layer interface, and the charged particles drift and are deposited along the alignment direction of the liquid crystal molecules.

If an effective electric field to be applied to the liquid crystal is changed due to the charged particles deposited in a certain region of the liquid crystal layer, the polarization state cannot be controlled as desired and quality of the image is degraded.

Measures to address such a problem have been proposed.

For example, a method for separating ion which causes a sticking phenomenon from an alignment layer or an electrode interface by making at least one of a potential of a pixel electrode and a potential of a counter electrode of a liquid crystal cell be a ground level while an image display operation is not performed has been proposed (refer to Japanese Patent Laid-Open No. 2005-55562, for example). Furthermore, a method for arranging a region of ion-trap electrodes in a non-display region of a liquid crystal element, and applying a direct current voltage to the ion-trap electrodes, so that impurity ion in the region of the ion-trap electrodes included in the non-display region which is not used for image display is absorbed has been proposed (refer to Japanese Patent Laid-Open No. 8-201830, for example).

However, when the method disclosed in Japanese Patent Laid-Open No. 2005-55562 is used, switching portions used to bring the counter electrode to the ground level should be included in circuits of the liquid crystal element. Therefore, the number of steps of manufacturing of the liquid crystal elements is increased. Furthermore, when the counter electrode is merely brought to the ground level, a force for separating the ion being attached to the alignment layer and the electrode interface is smaller than the coulomb force, and therefore, only small effect is attained.

Furthermore, when the method disclosed in Japanese Patent Laid-Open No. 8-201830 is employed, since the ion-trap electrodes which suck the ion is newly arranged on the non-display region, the number of steps of manufacturing the liquid crystal element is increased. In addition, since impurity of the ion is absorbed by the coulomb force and the coulomb force is in inversed proportion to the squared of a distance, the ion generated in portions separated from the ion-trap electrodes cannot be effectively absorbed.

SUMMARY OF THE INVENTION

The present invention provides a liquid crystal display device in which an adverse effect which is caused by deposition of charged particles on a liquid crystal layer can be avoided without newly adding a configuration including switching portions and ion-trap electrodes to a liquid crystal element.

According to an exemplary embodiment of the present invention, there is provided a liquid crystal display device includes a liquid crystal panel configured such that a portion between a first electrode layer and a second electrode layer is filled with liquid crystal, a light source configured to supply light to the liquid crystal panel and a driving unit configured to control a voltage to be applied to the liquid crystal of the liquid crystal panel, wherein the driving unit applies the voltage for dispersing charged particles in the liquid crystal of the liquid crystal panel to the liquid crystal panel, wherein the driving unit controls strength of the voltage for dispersing the charged particles in accordance with a length of elapsed time from a point turning on the liquid crystal display device, and wherein, as the length of elapsed time from a point turning on the liquid crystal display device becomes longer, the driving unit lowers the voltage for dispersing the charged particles.

Further features of the present invention will become apparent from the following description of exemplary embodiments with reference to the attached drawings.

BRIEF DESCRIPTION OF THE DRAWINGS

FIG. 10 is a diagram illustrating voltages to be applied to the reflection pixel electrode layer for individual display portions of the liquid crystal element.

FIGS. 11A and 11B show a flowchart illustrating control of a floating operation and a dispersing operation.

FIG. 16 is a flowchart illustrating control of a floating operation and a dispersing operation.

DESCRIPTION OF THE EXEMPLARY EMBODIMENTS

Exemplary embodiments of the present invention will now be described in detail hereinafter with reference to the accompanying drawings.

First Exemplary Embodiment

A projector serving as a liquid crystal display device including a liquid crystal element will be described.

Figure 1:
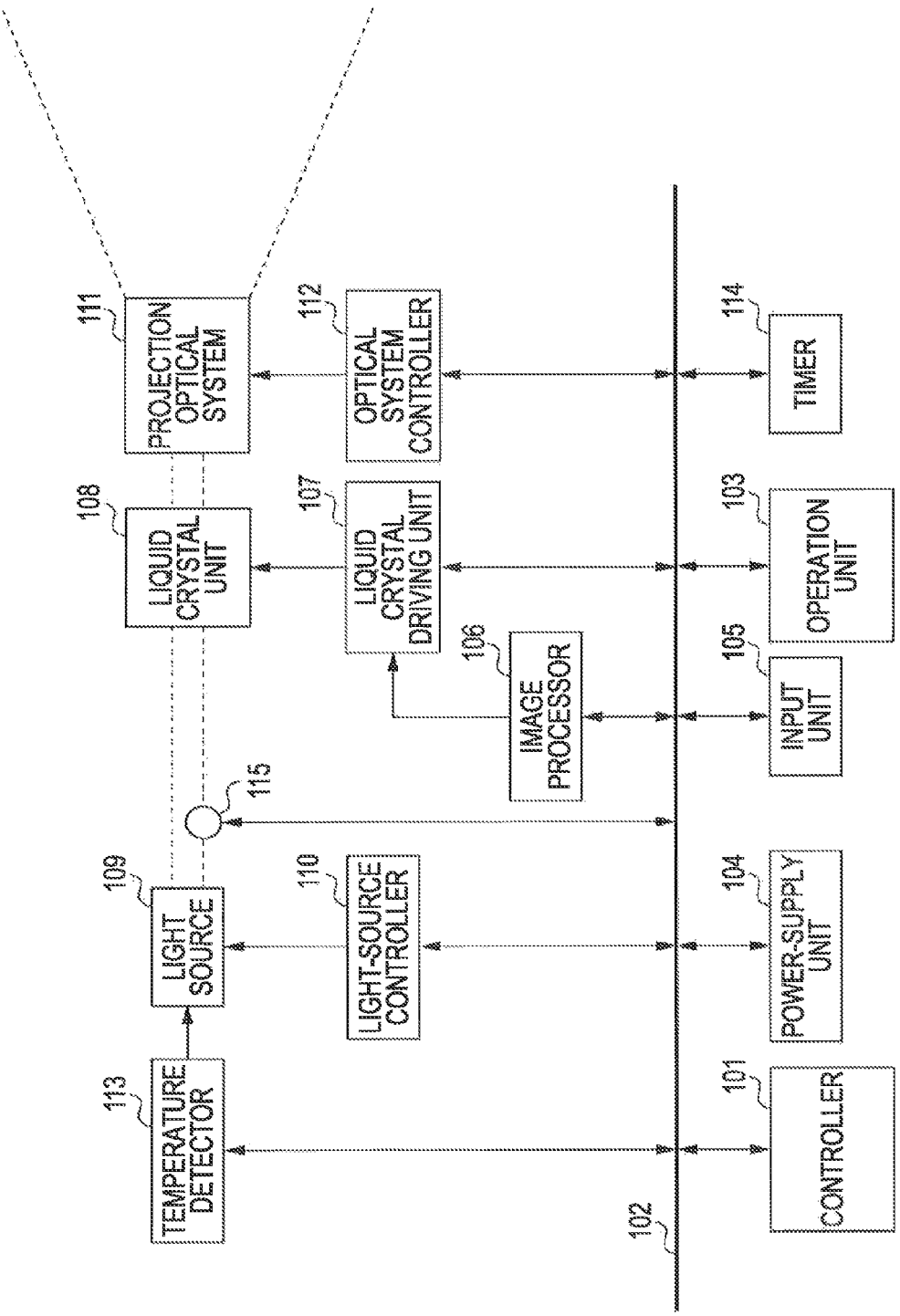
FIG. 1 is a block diagram illustrating a projector according to an exemplary embodiment of the present invention.

FIG. 1 is a block diagram illustrating main components of the projector according to a first exemplary embodiment of the present invention.

A controller 101 controls blocks of the projector. A data bus 102 is used to transmit and receive various signals such as control signals and image signals. An operation unit 103 accepts user's operations. A power supply unit 104 controls electric power supplied to the blocks in the projector.

An input unit 105 receives image signals transmitted from PCs (Personal Computers) DVD (Digital Versatile Disc) players, television tuners, and memory cards, for example. An image processor 106 converts the number of pixels of an image signal into the appropriate number of pixels in accordance with the number of pixels of an liquid crystal panel, which will be described hereinafter, increases the number of frames of the input signal for an AC (Alternating Current) driving of the liquid crystal element, which will be described hereinafter, and performs correction processing suitable for image formation performed by the liquid crystal element. The correction processing performed by the image processor 106 includes processing of correcting a gamma characteristic of an input image and processing of cancelling uneven brightness generated by an optical system.

A liquid crystal driving unit 107 forms an image in the liquid crystal element included in a liquid crystal unit 108 in accordance with the image signal subjected to the correction processing performed by the image processor 106. When a projector employing three liquid crystal elements is used, for example, the liquid crystal elements are controlled for individual three colors so that images for individual three colors are formed in the corresponding liquid crystal elements. In this case, a light beam which is emitted from a light source 109, which will be described hereinafter, is separated into three light beams having respective three colors, and the three light beams are supplied to the liquid crystal elements so that the colors of the three light beams correspond to the colors of the liquid crystal elements. Thereafter, optical images for individual colors are formed, the optical images are combined with one another so that a combined image is obtained, and the combined image is supplied to a projection optical system 111. In this exemplary embodiment, the liquid crystal element is in a vertical alignment nematic (VAN) mode, and liquid crystal molecules of a liquid crystal layer are aligned substantially perpendicular to an electrode layer.

The light source 109 emits light to be used to project an image on a screen (not shown). A light source controller 110 controls an on/off operation and light quantity of the light source 109. The projection optical system 111 is used to project an optical image obtained through the liquid crystal unit 108 on the screen not shown). An optical system controller 112 controls a zooming operation and a focusing operation of the projection optical system 111.

A temperature detector 113 disposed near the light source 109 measures a temperature of the light source 109 (performs temperature measurement) and transmits a result of the measurement to the controller 101. A timer 114 which works on a battery (not shown) performs time-measurement operation and transmits a result of the time-measurement operation to the controller 101. A light sensor 115 measures light which has reached the projection optical system 111 (performs a photometry operation), and transmits a result of the photometry operation to the controller 101.

The controller 101 controls the power supply unit 104, the liquid crystal driving unit 107, and the light source 109, for example, using at least one of data items transmitted from the temperature detector 113, the timer 114, and the light sensor 115.

Normal operation of the projector will now be described.

The controller 101 included in the projector of this exemplary embodiment instructs the power supply unit 104 to supply electric power to the blocks when the operation unit 103 issued an instruction representing power-on. In accordance with the instruction issued by the controller 101, the blocks are brought to waiting states. After the electric power is supplied, the controller 101 instructs the light source controller 110 to start light emission from the light source 109. Then, the controller 101 instructs the optical system controller 112 to control the projection optical system 111. The optical system controller 112 obtains information on a distance to the screen (not shown), and controls the zooming operation and the focusing operation of the projection optical system 111. Note that the optical system controller 112 may control the projection optical system ill in accordance with an operation of a user using the operation unit 103.

A projection operation is thus prepared. Then, an image signal input through the input unit 105 is converted into an image signal having a resolution suitable for the liquid crystal unit 108 by the image processor 106, and subjected to the gamma correction and the correction for uneven brightness. Then, an image is formed in the liquid crystal unit 108 under the control of the liquid crystal driving unit 107 in accordance with the image signal which has been subjected to the correction performed by the image processor 106.

In general, the liquid crystal element which has received the image signal employs a line-inversion driving method in which positive polarities and negative polarities of electric fields to be applied are inverted for individual lines of aligned pixels, and the positive polarities and the negative polarities are inverted in a predetermined period such as 60 Hz. Alternatively, a field-inversion driving method in which positive polarities and negative polarities of electric fields to be applied to all aligned pixels are inverted in a predetermined period may be employed. Either of the methods may be employed as long as a characteristic in which even when polarities of electric fields to be applied to liquid crystal are inverted, a polarization state of light can be changed by changing an alignment direction of the molecules.

An example of a configuration of the liquid crystal element of the liquid crystal unit 108 will be described with reference to FIGS. 2 and 3. In this exemplary embodiment, the liquid crystal element employed in the reflection liquid crystal projector will be described.

Figure 2:
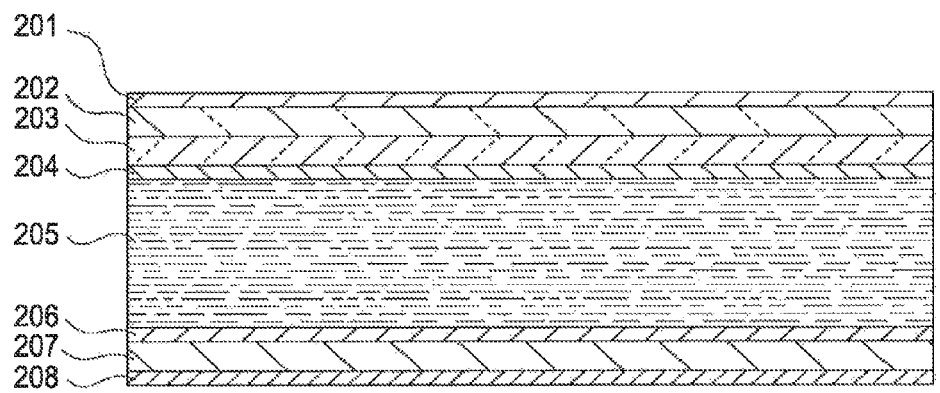
FIG. 2 is a sectional view illustrating a liquid crystal element.

FIG. 2 is a sectional view illustrating a portion of the liquid crystal element.

As shown in FIG. 2, the liquid crystal element includes an AR coating layer 201, a glass substrate 202, and a transparent electrode layer 203 (first electrode layer) which is formed of a transparent electrode arranged on the glass substrate 202. The liquid crystal element further includes a first alignment layer 204 arranged between the transparent electrode layer 203 and a liquid crystal layer 205.

The liquid crystal element further includes the liquid crystal layer 205 arranged between the first alignment layer 204 and a second alignment layer 206 which is also included in the liquid crystal element. The liquid crystal element further includes a reflection pixel electrode layer 207 (second electrode layer) which is formed of metal such as aluminum and which faces the transparent electrode layer 205, and includes an Si substrate 208 in which the reflection pixel electrode layer 207 is arranged thereon. Note that the transparent electrode layer 203 and the reflection pixel electrode layer 207 are collectively referred to as an electrode layer as needed hereinafter.

Figure 3:
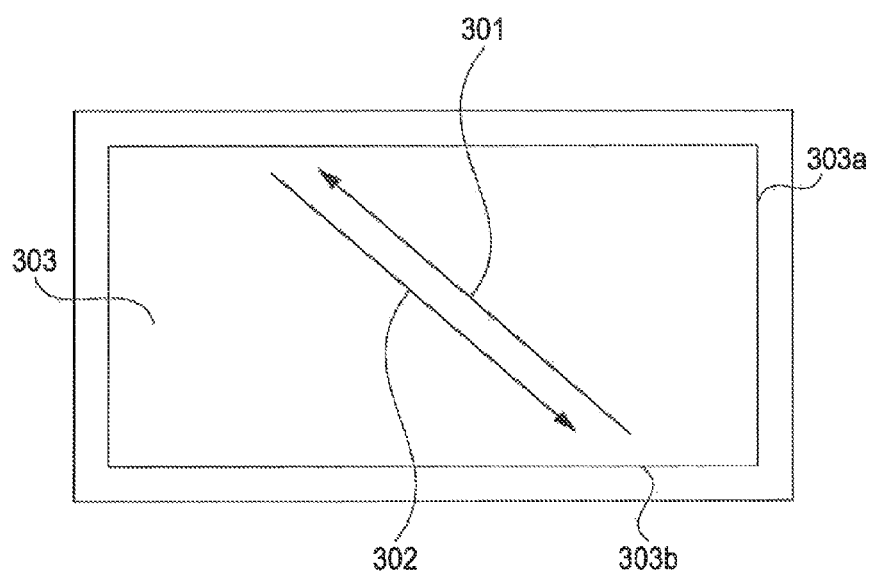
FIG. 3 is a diagram illustrating a display surface of the liquid crystal element viewed from a pretilt direction.

FIG. 3 is a diagram illustrating the liquid crystal element viewed from the glass substrate 202.

In FIG. 3, a reference numeral 301 denotes a director direction (pretilt direction) of liquid crystal molecules aligned by the first alignment layer 204, a reference numeral 302 denotes a director direction (pretilt direction) of the liquid crystal molecules aligned by the second alignment layer 206, and a reference numeral 303 denotes a liquid-crystal effective display region of an image forming surface. In the liquid crystal element, the liquid crystal molecules arranged on the alignment layer are tilted by several degrees so that the liquid crystal molecules are tilted in a predetermined direction when an electric field is applied to the liquid crystal. This tilted direction is referred to as a director direction. Axes of the director directions 301 and 302 are tilted by several degrees in a direction perpendicular to surfaces of the alignment layers 204 and 200, are opposite to each other, and are subjected to alignment processing in a direction tilted by 45 degrees relative to a short side 303a and a long side 303b of the effective display region 303.

In a normal operation, the liquid crystal driving unit 107 controls a voltage to be applied to the transparent electrode layer 203 to be constant (for example, 7V) and controls a voltage to be applied to the reflection pixel electrode layer 207 to have a AC waveform so that an image is formed on the liquid crystal element. In this way, an AC electric field is generated between the transparent electrode layer 203 and the reflection pixel electrode layer 207. Note that another method for generating an AC electric field may be employed.

Figure 4:
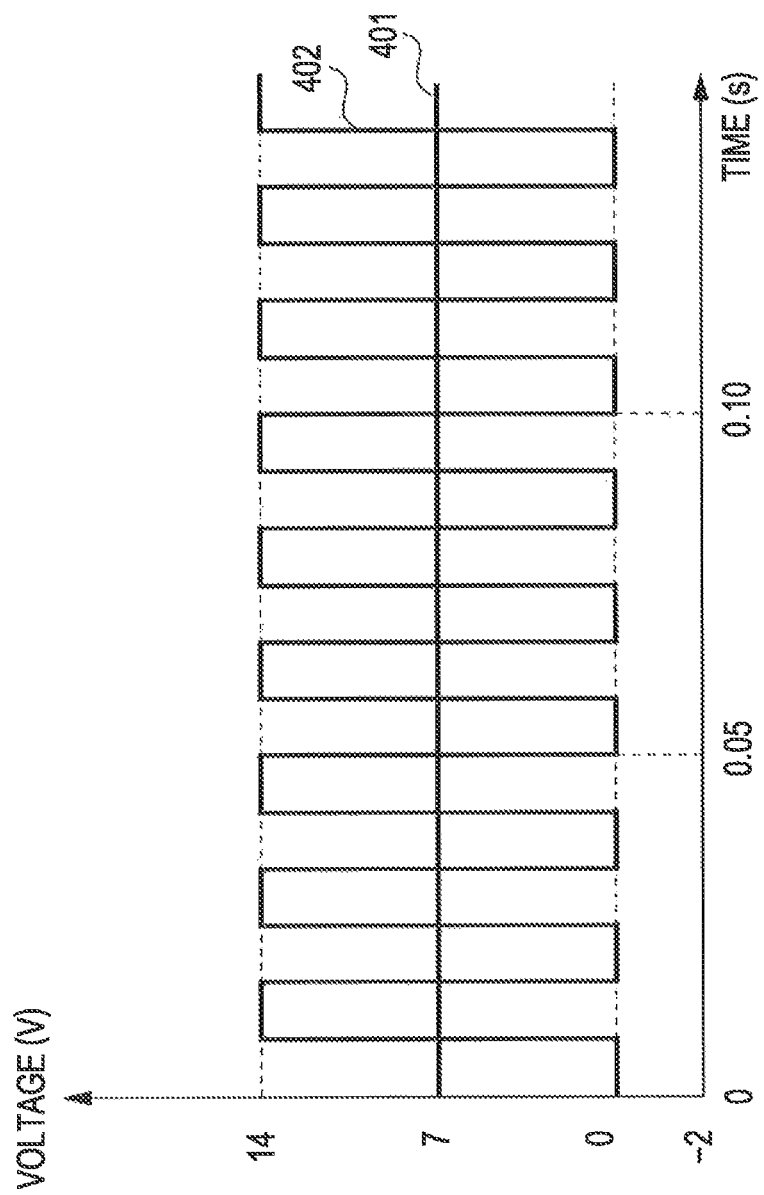
FIG. 4 is a diagram illustrating voltages to be applied to a transparent electrode layer and a reflection pixel electrode layer.

FIG. 4 is a diagram illustrating voltages to be applied to the transparent electrode layer 203 and the reflection pixel electrode layer 207.

In FIG. 4, a voltage 401 is to be applied to the transparent electrode layer 203 and a voltage 402 is to be applied to the reflection pixel electrode layer 207. The voltage 402 to be applied to the reflection pixel electrode layer 207 is an AC voltage having a center voltage of 7V, an amplitude of 7V, and a frequency of 60 Hz. In general, a degree of a change of a polarization state of light relies on an absolute value of a potential difference between the transparent electrode layer 203 and the reflection pixel electrode layer 207 irrespective of a polarity of the potential difference. Therefore, in order to prevent flicker from being generated, the center voltage of the voltage 402 is substantially the same as the voltage 401.

Here, a state of the liquid crystal element obtained when the projector of this exemplary embodiment has been used for a long period of time will be described.

Due to light which has high brightness and which is irradiated to the power supply unit 104 from the light source 109, the power supply unit 104 has high temperature for a long period of time. In this state, when the liquid crystal molecules are driven, charged particles move in the director (pretilt) direction of the liquid crystal molecules along an interface of the second alignment layer 205 on the reflection pixel electrode layer 207 side. These charged particles are included in the liquid crystal layer 205, a sealing member which is an organic substance arranged near the liquid crystal layer 205, the alignment layers 204 and 206, the transparent electrode layer 203, and the reflection pixel electrode layer 207, for example. The charged particles move when the liquid crystal display molecules are driven at high temperature.

The charged particles have a characteristic in which the charged particles move in a direction in which the liquid crystal molecules of the liquid crystal included in the image formation surface of the liquid crystal element are tilted (that is, an alignment direction).

Figure 5:
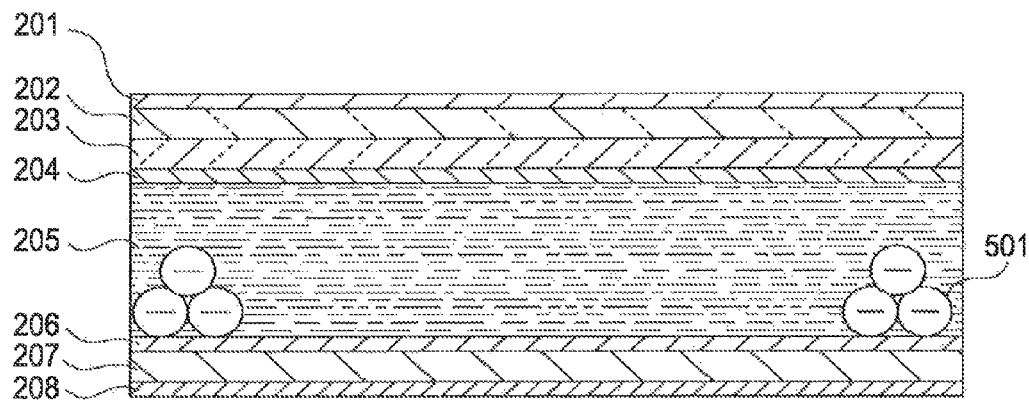
FIG. 5 is a diagram illustrating a state in which charged particles are deposited on the liquid crystal element.
Figure 6:
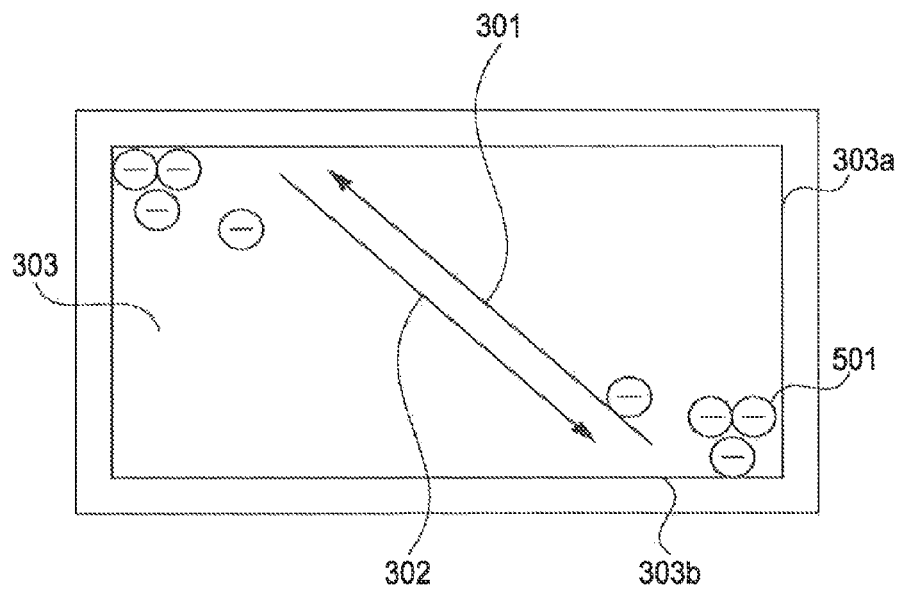
FIG. 6 is another diagram illustrating the state in which the charged particles are deposited on the liquid crystal element.

After moving, the charged particles are deposited in a portion, such as a corner of the effective display region, which relies on the alignment direction, in the liquid crystal layer 205. FIGS. 5 and 6 are diagrams illustrating a state in which the charged particles are deposited.

FIG. 5 is a sectional view illustrating a configuration of a portion of the liquid crystal element. In FIG. 5, a reference numeral 501 denotes the charged particles. FIG. 6 is a diagram illustrating the liquid crystal element viewed from the glass substrate 202 side. In FIG. 6 also, the reference numeral 501 denotes the charged particles.

In a case where the charged particles are deposited as shown in FIGS. 5 and 6, even when a predetermined voltage is applied between the electrodes, strength of electric fields to be applied to the liquid crystal layer is reduced or increased due to electric charge of the charged particles, and therefore, the electric fields substantially applied to the liquid crystal layer are reduced or increased. In this case, substantial strengths of the electric fields to be applied to the liquid crystal are changed due to the charged particles deposited in a certain portion of the liquid crystal layer, and the polarization state cannot be controlled as desired. Accordingly, there arises a problem in that image quality is degraded.

In order to avoid the state in which the charged particles 501 are deposited as described above, the charged particles 501 deposited in the certain portion in the liquid crystal layer are first separated from the electrode layer, and then, dispersed in the entire liquid crystal layer. Specifically, when negatively-charged particles are deposited, electric fields are applied from the electrode layer in which the charged particles are deposited to the other electrode layer so that the charged particles float. Then, the charged particles are dispersed in the entire liquid crystal layer by applying, to portions including a large number of the charged particles, voltages lower than voltages to be applied to other portions.

Here, in this exemplary embodiment, the liquid crystal driving unit 107 drives the liquid crystal element of the liquid crystal unit 108 as described below.

In this case, instead of a method for driving the liquid crystal element by changing a polarity in a predetermined cycle by inverting positive and negative polarities of the electric fields to be applied to the liquid crystal layer, a method for driving the liquid crystal element in which the polarities of the electric fields to be applied to the liquid crystal layer are not changed (for example, a DC (direct current) electric field is applied to the liquid crystal layer) is used.

Figure 7:
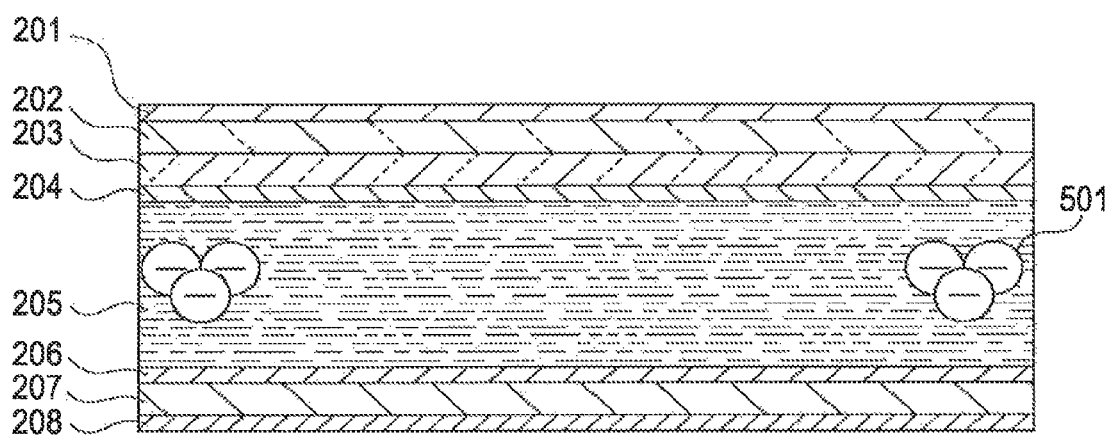
FIG. 7 is a diagram illustrating a state in which the charged particles are floated in the liquid crystal layer.
Figure 8:
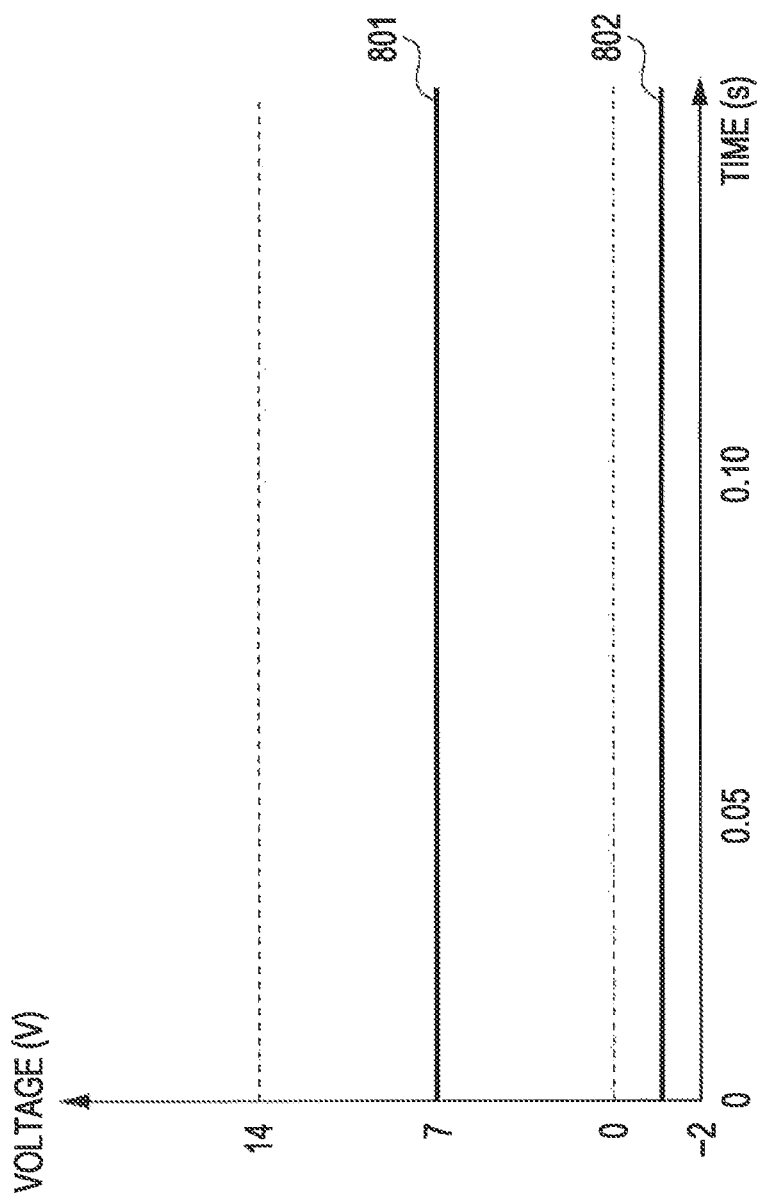
FIG. 8 is a diagram illustrating voltages to be applied to the transparent electrode layer and the reflection pixel electrode layer.

In order to float the charged particles 501 which have been deposited in the state as shown in FIG. 5, the liquid crystal driving unit 107 controls voltages so that positive voltages are applied to the transparent electrode layer 203 of the liquid crystal element and negative voltages are applied to the reflection pixel electrode layer 207 of the liquid crystal element. Then, the controller 101 controls the liquid crystal driving unit 107 so that the voltages are applied for a predetermined period of time. By this, the negatively-charged particles 501 deposited on the reflection pixel electrode layer 207 repel the negative voltages applied to the reflection pixel electrode layer 207, and therefore, the charged particles 501 float as shown in FIG. 7. FIG. 8 shows states of the voltages to be applied to the transparent electrode layer 203 and the reflection pixel electrode layer 207 under this condition.

In FIG. 8, a reference numeral 801 denotes a voltage to be applied to the transparent electrode layer 203, and a reference numeral 802 denotes a voltage to be applied to the reflection pixel electrode layer 207.

A polarity of the voltage to be applied to the reflection pixel electrode layer 207 is not specified as long as the voltage is lower than the voltage to be applied to the transparent electrode layer 203. That is, any voltage may be applied as long as a polarity of the electric field to be applied to the liquid crystal layer 205 is substantially not changed.

Furthermore, in a plurality of portions in the image forming surface of the liquid crystal element, hourly-averaged strengths of electric fields to be applied to the liquid crystal layer 205 are substantially the same.

In this exemplary embodiment, if an electric field is applied from the transparent electrode layer 203 to the reflection pixel electrode layer 207 in an hourly average, the voltage to be applied to the reflection pixel electrode layer 207 may temporarily exceed the voltage to be applied to the transparent electrode layer 203.

In a driving mode (first mode) in which an electric field is thus applied, the charged particles 501 in the liquid crystal layer 205 can be floated.

An operation of dispersing the floated charged particles 501 will now be described.

In order to disperse the floated charged particles 501, the liquid crystal driving unit 107 applies voltages to the electrode layer so that the charged particles 501 are attracted to a corner which is diagonally across from the corner where the floated charged particles 501 have been deposited. Therefore, for example, different voltages are applied to the reflection pixel electrode layer 207 for individual display portions of the liquid crystal element, and the voltages are applied for a predetermined period of time. In this way, the charged Particles 501 are moved by the coulomb force.

Figure 9:
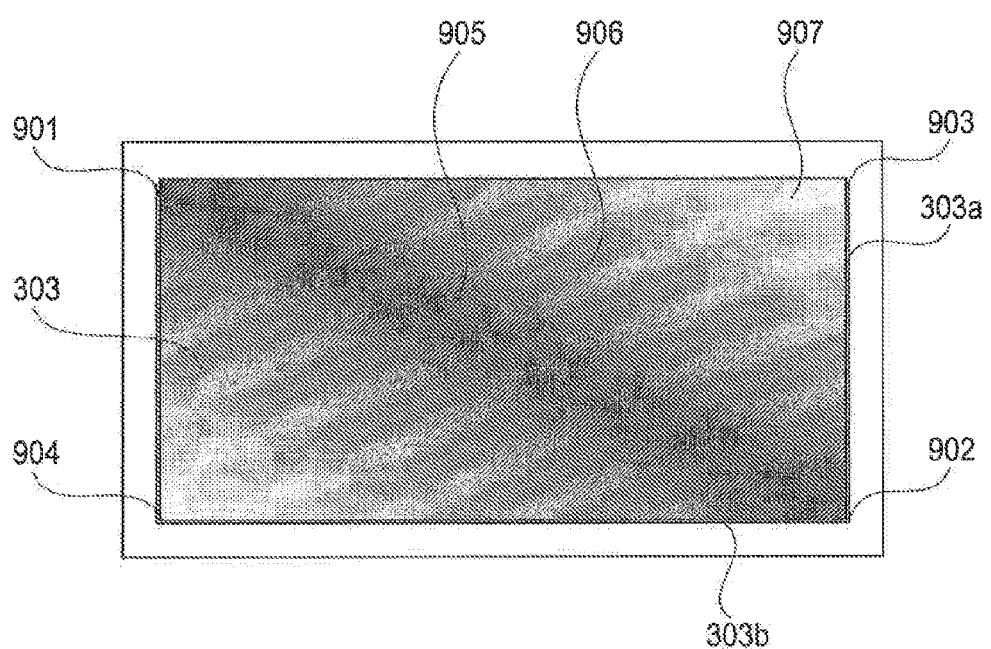
FIG. 9 is a diagram illustrating distribution of voltages to be applied to the reflection pixel electrode layer.

In a case where constant voltages of certain levels are to be applied to the reflection pixel electrode layer 207 while voltages of approximately 7V are constantly applied to the transparent electrode layer 203 will be described. FIG. 9 is a diagram illustrating distribution of voltages applied to the reflection pixel electrode layer 207.

In FIG. 9, portions in which high voltages are applied to the reflection pixel electrode layer 207 are shown in white whereas portions in which low voltages are applied to the reflection pixel electrode layer 207 are shown in dark color. In FIG. 9, portions 901 and 902 have large amounts of charged particles 501 whereas portions 903 and 904 have small amounts of charged particles 501. Therefore, when the charged particles 501 have negative polarities, positive voltages are applied to the portions 903 and 904 of the reflection pixel electrode layer 207 so that the charged particles 501 are attracted.

In FIG. 9, a low voltage is applied to a portion 905, a high voltage is applied to a portion 907, and a voltage applied to a portion 906 is larger than the voltage applied to the portion 905 but smaller than the voltage applied to the portion 907.

In this exemplary embodiment, the description is made assuming that constant voltages of certain levels are to be applied to the reflection pixel electrode layer 207. However, the voltages may be irregularly varied or the voltages may be AC voltages. That is, any voltage may be applied as long as a value of integral of a strength of an electric field to be applied to the liquid crystal at the portion 905 is smaller than a value of integral of a strength of an electric field applied to the liquid crystal at the portion 906 and a value of integral of a strength of an electric field applied to the liquid crystal at the portion 907, and the value of integral of the strength of the electric field to be applied to the liquid crystal at the portion 907 is larger than the value of integral of the strength of the electric field applied to the liquid crystal at the portion 905 and the value of integral of the strength of the electric field applied to the liquid crystal at the portion 906. FIG. 10 shows voltages to be applied to the reflection pixel electrode layer 207 at the portions 905 to 907. In this exemplary embodiment, a case where constant voltages of certain levels are applied to the reflection pixel electrode layer 207 will be described.

FIG. 10 is a diagram illustrating the voltages to be applied to the reflection pixel electrode layer 207 for individual display portions of the liquid crystal element. In FIG. 10, a reference numeral 1001 denotes a voltage applied to the reflection pixel electrode layer 207 at the portion 907, a reference numeral 1002 denotes a voltage applied to the reflection pixel electrode layer 207 at the portion 906, ends reference numeral 1003 denotes a voltage applied to the reflection pixel electrode layer 207 at the portion 905.

It is assumed that the liquid crystal element of this exemplary embodiment does not allow light beams to be transmitted when voltages of 7 V are applied to the transparent electrode layer 203 and voltages of 7 V are applied to the reflection pixel electrode layer 207 (that is, a negligible amount of electric fields are generated). Furthermore, it is assumed that the liquid crystal element allows most of the light beams irradiated in the polarization direction to be transmitted when voltages of 14 V are applied to the reflection pixel electrode layer 207. In this case, an image having a pattern shown in FIG. 9 is formed on the liquid crystal element.

When a voltage of 0V is applied to the liquid crystal element at the portion 905, the liquid crystal element is brought to a bright state since the liquid crystal element allows most of the light beams irradiated in the polarization direction. Accordingly, an image having a pattern in which the portion 905 becomes bright, the portion 906 becomes dark, and the portion 907 becomes bright may be formed.

When a voltage of 7V is applied to the reflection pixel electrode layer 207 at the portion 907, the liquid crystal element is brought to a dark state since the liquid crystal element prevents the light beams from being transmitted. Accordingly, an image having a pattern in which the portion 905 becomes bright, the portion 906 becomes slightly bright, and the portion 907 becomes dark may be formed.

Furthermore, for the plurality of individual portions an the image forming surface of the liquid crystal element, hourly-averaged strengths of electric fields applied to the liquid crystal should be different from one another. In a driving mode (second mode) in which electric fields are thus applied, the charged particles 501 in the liquid crystal layer 205 can be dispersed.

By applying such voltages to the reflection pixel electrode layer 207, the electric field to be applied to the liquid layer 205 can be controlled so that the negatively-charged particles 501 are floated and dispersed. Accordingly, the quality of an image is prevented from being degraded.

In this exemplary embodiment, the description is made assuming that the negatively-charged particles 501 are used. However, positively-charged particles may be deposited on the transparent electrode layer 203. Even when the positively charged particles are deposited, the charged particles can be floated and dispersed by performing an operation similar to the operation of this exemplary embodiment while polarities are changed.

Next, in the operation of the projector described above, control of an operation of floating the charged particles 501 and an operation of dispersing the charged particles 501 will be described with reference to FIG. 1 and FIGS. 11 to 15. In this exemplary embodiment, in order to reduce a possibility that an unnecessary pattern image which is formed on the liquid crystal element due to the operation of floating and the operation of dispersion is recognized by a user, the operations are controlled in accordance with a state of the light source 109. In this exemplary embodiment, the operation of floating the charged particles 501 of the liquid crystal element is referred to as a "floating operation", and the operation of dispersing the charged part icier 501 is referred to as a "dispersing operation". In this exemplary embodiment, the negatively-charged particles 501 are used.

Figure 11B:
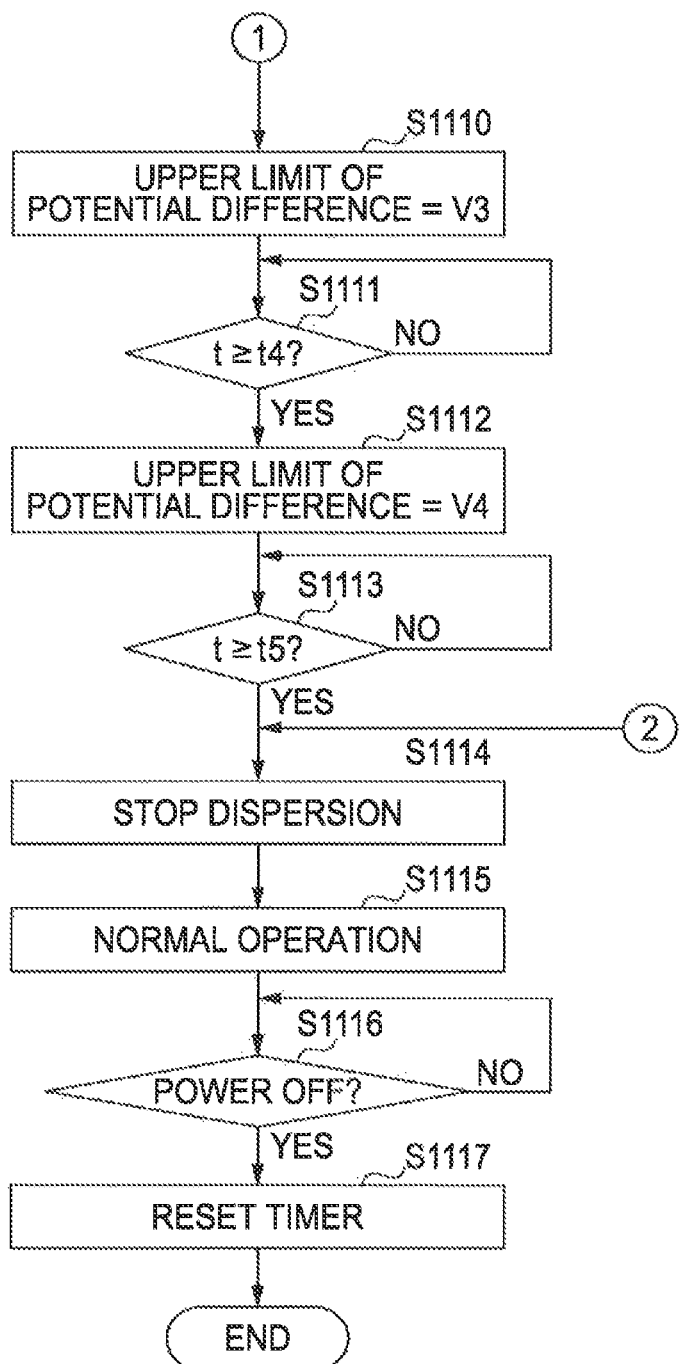

FIGS. 11A and 11B show a flowchart illustrating the control of the floating operation and the dispersing operation of the projector of this exemplary embodiment.

First, the controller 101 instructs the power supply unit 104 to supply electric power to the blocks of the projector in accordance with an instruction on power-on issued by the operation unit 103. Then, the controller 101 reads, from the timer 114, a time ta which represents a period of time from when the power supply was stopped immediately before a current time to the current time in step S1101.

In step S1102, the controller 101 determines whether the read time ta is equal to or larger than a time t1 representing a period of time the projector has been stopped (approximately five minutes, for example).

When the determination is affirmative in step S1102, since a long period of time has been passed after the projector is turned off and before the projector is turned on again, a certain period of time is required before the light source 109 becomes totally bright after the projector is turned on. On the other hand, when the determination is negative in step S1102, since only a short period of time has been passed after the projector is turned off and before the projector is turned on again, the light source 109 becomes totally bright within a short period of time after the projector is turned on.

In this exemplary embodiment, a state of the light source 109 is presumed in accordance with a time obtained from the timer 114 so that electric fields to be applied to the liquid crystal layer 205 of the liquid crystal element in the floating operation and the dispersing operation are controlled.

When the determination is affirmative in step S1102, the controller 101 resets the timer 114 first, and measures a period of time from when the power is turned on to a current time, in step S1103. Then, before instructing the liquid crystal driving unit 107 to perform the floating operation, the controller 101 instructs the liquid crystal driving unit 107 to set V1 (4V, for example) as an upper limit value of a potential difference (potential difference between the transparent electrode layer 203 and the reflection pixel electrode layer 207) to be applied to the liquid crystal layer 205, in step S1104. When 4V is set as the upper limit value of the potential difference to be applied to the liquid crystal layer 205, assuming that constant voltages of 7 V are applied to the transparent electrode layer 203, the liquid crystal driving unit 107 can control the voltages to be applied to the reflection pixel electrode layer 207 in a range from 3 V to 11 V.

When a value V1 is determined to be the upper limit value of the potential difference to be applied to the liquid crystal layer 205, the upper limit value can be controlled by setting the upper limit value to a DA converter of the liquid crystal driving unit 107. Alternatively, the upper limit value of the potential difference to be applied to the liquid crystal layer 205 may be controlled by changing a correction setting of a gamma correction unit of the liquid crystal driving unit 107. These facts are true to throughout the exemplary embodiment.

In step S1105, the controller 101 instructs the liquid crystal driving unit 107 to perform the floating operation.

When receiving the instruction on the floating operation from the controller 101, the liquid crystal driving unit 107 controls the voltages to be applied to the transparent electrode layer 203 and the voltages to be applied to the reflection pixel electrode layer 207 so as to control electric fields to be applied to the liquid crystal layer 205 of the liquid crystal element. Here, since the charged particles 501 are deposited on the reflection pixel electrode layer 207, voltages of 7 V are to be applied to the transparent electrode layer 203 and voltages of 3 V are to be applied to the reflection pixel electrode layer 207 so that a potential difference to be applied to the liquid crystal layer 205 corresponds to the value V1 (4 V in this exemplary embodiment) set in advance.

Then, the controller 101 successively receives information blocks regarding time periods which are measured using the timer 114, and determines whether a time t which represents a period of time from when the power is turned on to a current time is equal to or larger than a floating operation time At2 representing a period of time from when the power is turned on to a certain time in the floating operation (eight seconds after the power is turned on), in step S1106. When the determination is affirmative in step S1106, the controller 101 instructs the liquid crystal driving unit 107 to set V2 (4 V, for example) as the upper limit value of the potential difference to be applied to the liquid crystal layer 205 when the liquid crystal driving unit 107 performs the dispersing operation, in step S1107.

Thereafter, in step S1108, the controller 101 instructs the liquid crystal driving unit 107 to perform the dispersing operation.

When receiving the instruction on the dispersing operation, the liquid crystal driving unit 107 controls the voltages to be applied to the transparent electrode layer 203 and the voltages to be applied to the reflection pixel electrode layer 207 so as to control the electric field to be applied to the liquid crystal layer 205 of the liquid crystal element. Here, voltages of 7 V, for example, are to be applied to the transparent electrode layer 203. In this case, since the charged particles 501 are negatively charged, voltages of 11 V are to be applied to portions in which the charged particles 501 on the reflection pixel electrode layer 207 are to be attracted whereas voltages of 7 V are to be applied to portions in which the charged particles 501 are to be moved away. This operation is performed so that the voltages to be applied to the portions in which the charged particles 501 are to be attracted and which generate a larger potential difference become larger than the voltages to be applied to the transparent electrode layer 203 by the value V2 in order to attain a potential difference to be applied to the liquid crystal layer 205 corresponding to the value V2 (4 V in this exemplary embodiment) set in advance.

Figure 12:
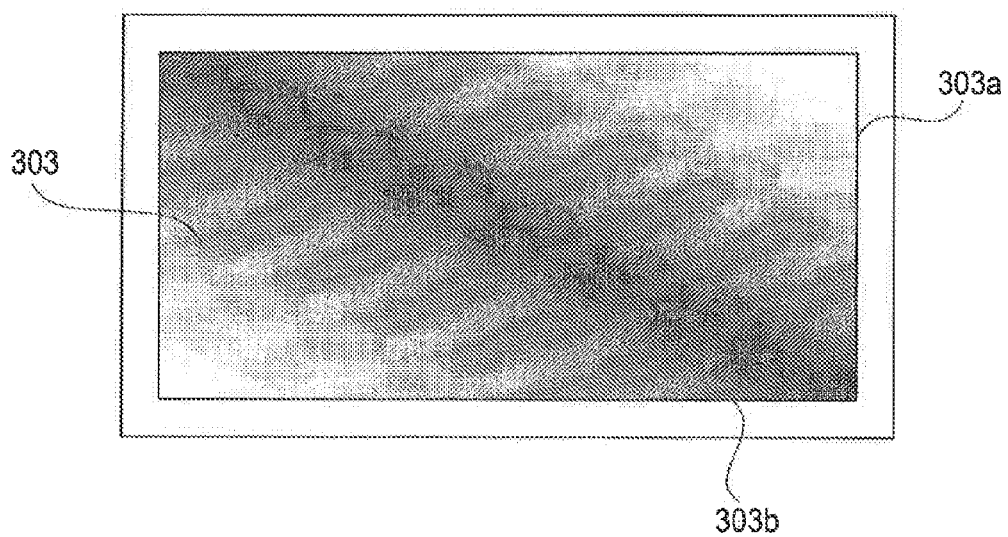
FIG. 12 is a diagram illustrating an example of a pattern image generated in the liquid crystal element.

FIG. 12 is a diagram illustrating an example of a pattern image generated on the liquid crystal element when the value V2 is set as the upper limit, value of the potential difference to be applied to the liquid crystal layer 205.

Alternatively, voltages of 11 V may be applied to the portions in which the charged particles 501 on the reflection pixel electrode layer 207 are to be attracted and voltages of 3 V may be applied to the portions in which the charged particles 501 are moved away. Furthermore, voltages of 7 V may be applied to the portions in which the charged particles 501 on the reflection pixel electrode layer 207 are to be attracted and voltages of 3 V may be applied to the portions in which the charged particles 501 are moved away. When the voltages to be applied to the refection pixel electrode layer 207 are changed, a pattern image different from the pattern image shown in FIG. 12 is obtained. However, brightness at portions having the highest brightness is substantially the same as that shown in FIG. 12.

In step S1109, the controller 101 successively receives information blocks regarding time periods which are measured using the timer 114, and determines whether the time t which represents a period of time from when the power is turned on to a current time is equal to or larger than a dispersing operation time At3 representing a period of time from when the power is turned on to a certain time in the dispersing operation (12 seconds after the power is turned on).

When the determination is affirmative in step S1109, the controller 101 instructs the liquid crystal driving unit 107 to set a value V3 (3 V, for example) as the upper limit value of the potential difference to be applied to the liquid crystal layer 205 when the liquid crystal driving unit 107 performs the dispersing operation, in step S1110.

Here, the light source 109 gradually becomes bright after the dispersing operation time At3 (12 seconds, for example) has passed after the power is turned on. Furthermore, in the liquid crystal element of this exemplary embodiment, the larger the potential difference to be applied to the liquid crystal layer 205 is, the easier the light beams are transmitted. Here, when the potential difference to be applied to the liquid crystal layer 205 is approximately the value V2 and when the light beams transmitted through the liquid crystal are projected on a screen, a difference between bright and dark may be recognized by the user.

Therefore, by changing the upper limit value of the potential difference to be applied to the liquid crystal layer 205 to the value V3 which is smaller than the value V2, the difference between bright and dark is reduced so as to be prevented from, being recognized by the user.

After the controller 101 changes the upper limit value of the potential difference to be applied to the liquid crystal layer 205 from the value V2 to the value V3, the liquid crystal driving unit 107 controls the voltages to be applied to the transparent electrode layer 203 and the voltages to be applied to the 207. Then, the potentials to be applied to the portions in which the charged particles 501 on the reflection pixel electrode layer 207 are to be attracted are changed from 11 V to 10 V. This operation is performed is that the voltages to be applied to the portions in which the charged particles 501 are to be attracted and which generate a larger potential difference become larger than the voltages to be applied to the transparent electrode layer 203 by the value V3 in order to attain a potential difference to be applied to the liquid crystal layer 205 corresponding to the value V3 (3 V in this exemplary embodiment) set in advance.

Figure 13:
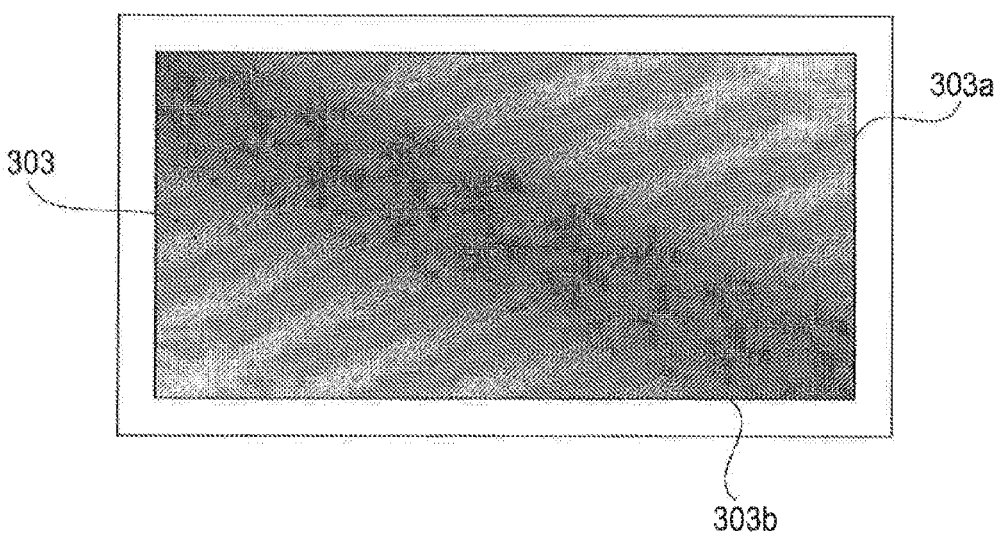
FIG. 13 is a diagram illustrating another example of the pattern image generated in the liquid crystal element.

FIG. 13 is a diagram illustrating an example of a pattern image generated on the liquid crystal element when the value V3 is set as the upper limit value of the potential difference to be applied to the liquid crystal layer 205. Portions having the highest brightness shown in FIG. 13 are darker than the portions having the highest brightness shown in FIG. 12, and a difference between bright and dark are smaller than that of FIG. 12.

Alternatively, voltages of 10 V may be applied to the portions in which the charged particles 501 on the reflection pixel electrode layer 207 are to be attracted and voltages of 4 V may be applied to the portions in which the charged particles 501 on the reflection pixel electrode layer 207 are to be moved away. Furthermore, voltages of 7 V may be applied to the portions in which the charged particles 501 on the reflection pixel electrode layer 207 are attracted, and voltages of 4 V may be applied to the portions in which the charged particles 501 are to be moved away. When the voltages to be applied to the reflection pixel electrode layer 207 are changed, a pattern image different from the pattern image shown in FIG. 13 is obtained. However, brightness at portions having the highest brightness is substantially the same as that shown in FIG. 13, and the difference between bright and dark of the pattern image is smaller than that of FIG. 12.

In step S1111, the controller 101 successively receives information blocks regarding time periods which are measured using the timer 114, and determines whether the time t which represents a period of time from when the power is turned on to a current time is equal to or larger than a dispersing operation time Bt4 representing a period of time from when the power is turned on to a certain time in the dispersing operation (16 seconds after the power is turned on). When the determination is affirmative in step S1111, the controller 101 instructs the liquid crystal driving unit 107 to set a value V4 (2 V, for example) as the upper limit value of the potential difference to be applied to the liquid crystal layer 205 when the liquid crystal driving unit 107 performs the dispersing operation, in step S1112.

Here, the light source 109 gradually becomes brighter after the dispersing operation time Bt4 (16 seconds, for example) has passed after the power is turned on. Here, when the potential difference to be applied to the liquid crystal layer 205 is approximately the value V3 and when the light beams transmitted through the liquid crystal are projected on the screen, a difference between bright and dark may be recognized by the user. Therefore, by changing the upper limit value of the potential difference to be applied to the liquid crystal layer 205 to the value V4 which is smaller than, the value V3, the difference between bright and dark is reduced so as to be prevented from being recognized by the user.

After the controller 101 changes the upper limit value of the potential difference to be applied to the liquid crystal layer 205 from the value V3 to the value V4, the liquid crystal driving unit 107 controls the voltages to be applied to the transparent electrode layer 203 and the voltages to be applied to the 207. Then, the potentials to be applied to the portions in which the charged articles 501 on the reflection pixel electrode layer 207 are to be attracted are changed from 10 V to 9 V. This operation is performed so that the voltages to be applied to the portions in which the charged particles 501 are to be attracted and which generate a larger potential difference become larger than the voltages to be applied to the transparent electrode saver 203 by the value V4 in order to attain a potential difference to be applied to the liquid crystal layer 205 corresponding to the value V4 (2 V in this exemplary embodiment) set in advance.

Figure 14:
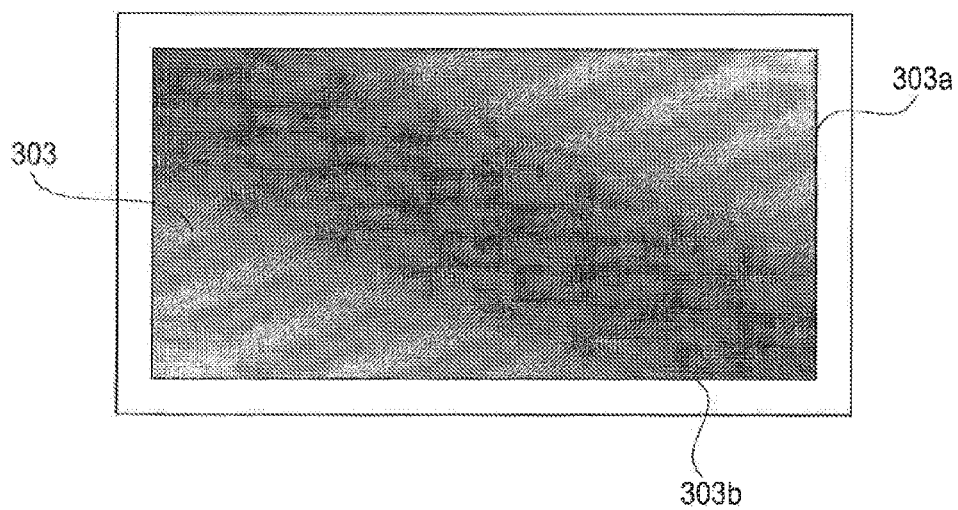
FIG. 14 is a diagram illustrating still another example of the pattern image generated in the liquid crystal element.

FIG. 14 is a diagram illustrating an example of a pattern image generated on the liquid crystal element when the value V4 is set as the upper limit value of the potential difference to be applied to the liquid crystal layer 205. Portions having the highest brightness shown in FIG. 14 are darker than the portions having the highest brightness shown in FIGS. 12 and 13, and a difference between bright and dark on the display surface are smaller than those of FIGS. 12 and 13.

Alternatively, voltages of 9 V may be applied to the portions in which the charged particles 501 on the reflection pixel electrode layer 207 are to be attracted and voltages of 5 V may be applied to the portions in which the charged particles 501 on the reflection pixel electrode layer 207 are to be moved away. Furthermore, voltages of 7 V may be applied to the portions in which the charged particles 501 on the reflection pixel electrode layer 207 are attracted, and voltages of 5 V may be applied to the portions in which the charged particles 501 are to be moved away. When the voltages to be applied to the reflection pixel electrode layer 207 are changed, a pattern image different from the pattern image shown in FIG. 14 is obtained. However, brightness at portions having the highest brightness is substantially the same as that shown in FIG. 14, and the difference between bright and dark of the pattern image is smaller than those of FIGS. 12 and 13.

In step S1113, the controller 101 successively receives information blocks regarding time periods which are measured using the timer 114, and determines whether the time t which represents a period of time from when the power is turned on to a current time is equal to or larger than a dispersing operation time Ct5 representing a period of time from when the power is turned on to a certain time in the dispersing operation (22 seconds after the power is turned on). When the determination is affirmative in step S1113, the controller 101 instructs the liquid crystal driving unit 107 to stop the dispersing operation in step S1114.

After the dispersing operation time Ct5 (22 seconds, for example) has passed after the power is turned on, it is determined that a period of time sufficient for the dispersion of the charged particles 501 of the liquid crystal element has passed.

Therefore, the dispersing operation is terminated. In step S1115, the controller 101 instructs the liquid crystal driving unit 107 to normally operate the liquid crystal unit 108.

Then, the user can use the projector in the normal usage.

After an image is normally projected, in accordance with an instruction on power-off issued by the operation unit 103 in step S1116, the controller 101 instructs the power supply unit 104 to supply power to the blocks of the projector. Then, the controller 101 resets the timer 114 so that a period of time from when the power is turned off is measured in step S1117. The operation of the projector is thus terminated.

A case where the read time ta is larger than the stop time t1 (when the determination is negative in step S1102) will now be described. In step S1118, the controller 101 resets the timer 114 and instructs the timer 114 to measure a period of time from when the power is turned on to a current time. Then, before instructing the liquid crystal driving unit 107 to perform the floating operation, the controller 101 instructs the liquid crystal driving unit 107 to set a value V5 (1 V, for example) as the upper limit value of the potential difference (potential difference between the transparent electrode layer 203 and the reflection pixel electrode layer 207) to be applied to the liquid crystal layer 205, in step S1119.

Note that a potential difference of a degree in which the pattern image is not recognized by the user even when the light source 109 is totally bright is preferably set as the upper limit value V5. In addition, a period of time in which the potential difference is applied is preferably set to be long since the potential difference is small.

In step S1120, the controller 101 instructs the liquid crystal driving unit 107 to perform the floating operation.

When receiving the instruction on the floating operation from the controller 101, the liquid crystal driving unit 107 controls the voltages to be applied to the transparent electrode layer 203 and the voltages to be applied to the reflection pixel electrode layer 207 so as to control electric fields to be applied to the liquid crystal layer 205 of the liquid crystal element. Here, since the charged particles 501 are deposited on the reflection pixel electrode layer 207, voltages of 7 V are to be applied to the transparent electrode layer 203 and voltages of 6 V are to be applied to the reflection pixel electrode layer 207.

Then, the controller 101 successively receives information blocks regarding time periods which are measured using the timer 114, and determines whether the time t which represents a period of time from when the power is turned on to a current time is equal to or larger than a floating operation time Bt6 representing a period of time from when the power is turned on to a certain time in the floating operation (30 seconds after the power is turned on), in step S1121. When the determination is affirmative in step S1121, the controller 101 instructs the liquid crystal driving unit 107 to set a value V6 (1 V, for example) as the upper limit value of the potential difference to be applied to the liquid crystal layer 205 when the liquid crystal driving unit 107 performs the dispersing operation, in step S1122.

Thereafter, in step S1123, the controller 101 instructs the liquid crystal driving unit 107 to perform the dispersing operation.

When receiving the instruction on the dispersing operation, the liquid crystal driving unit 107 controls the voltages to be applied to the transparent electrode layer 203 and the voltages to be applied to the reflection pixel electrode layer 207 so as to control the electric field to be applied to the liquid crystal layer 205 of the liquid crystal element. Here, voltages of 7 V, for example, are to be applied to the transparent electrode layer 203. In this case, since the charged particles 501 are negatively charged, voltages of 8 V are to be applied to the portions in which the charged particles 501 on the reflection pixel electrode layer 207 are to be attracted whereas voltages of 7 V are applied to the portions in which the charged particles 501 are to be moved away. This operation is performed so that the voltages to be applied to the portions in which the charged particles 501 are to be attracted and which generate a larger potential difference become larger than the voltages to be applied to the transparent electrode layer 203 by the value V6 in order to attain a potential difference to be applied to the liquid crystal layer 205 corresponding to the value V6 (1 V in this exemplary embodiment) set in advance. Here, a potential difference of a degree in which the pattern image is not recognized by the user even when the light source 109 is totally bright is preferably set to the upper limit value V6.

Figure 15:
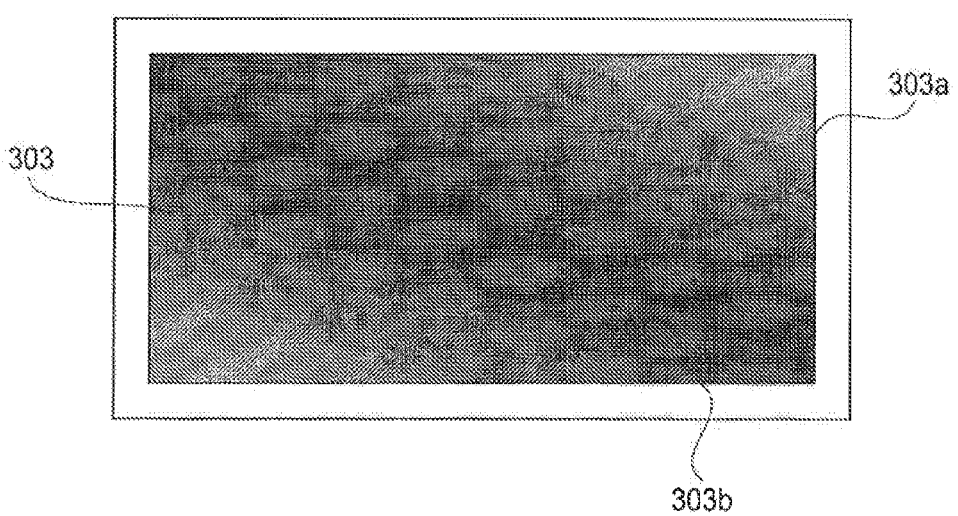
FIG. 15 is a diagram illustrating a further example of the pattern image generated in the liquid crystal element.

FIG. 15 is a diagram illustrating an example of a pattern image generated on the liquid crystal element when the value V6 is set as the upper limit value of the potential difference to be applied to the liquid crystal layer 205.

Alternatively, voltages of 8 V may be applied to the portions in which the charged particles 501 on the reflection pixel electrode layer 207 are to be attracted and voltages of 6 V may be applied to the portions in which the charged particles 501 are moved away. Furthermore, voltages of 7 V may be applied to the portions in which the charged particles 501 on the reflection pixel electrode layer 207 are to be attracted and voltages of 6 V may be applied to the portions in which the charged particles 501 are moved away. When the voltages to be applied to the reflection pixel electrode layer 207 are changed, a pattern image different from the pattern image shown in FIG. 15 is obtained. However, brightness at portions having the highest brightness is substantially the same as that shown in FIG. 15.

In step S1124, the controller 101 successively receives information blocks regarding time periods which are measured using the timer 114, and determines whether the time t which represents a period of time from when the power is turned on to a current time is equal to or larger than a dispersing operation time Dt7 representing a period of time from when the power is turned on to a certain time in the dispersing operation (40 seconds after the power is turned on). When the determination is affirmative in step S1124, the process proceeds to step S1114.

As described above, the projector of this exemplary embodiment presumes the state of the light source 109 in accordance with the information blocks obtained using the timer 114, and controls the electric fields to be applied to the liquid crystal layer 205 in the floating operation and the dispersing operation. In this way, the projector of this exemplary embodiment reduces the possibility that a pattern image which is formed on the liquid crystal element due to the floating operation and the dispersing operation is recognized by a user.

In this exemplary embodiment, the state of the light source 109 is presumed in accordance with the information blocks obtained using the timer 114. However, the state of the light source 109 may be presumed in accordance with information blocks representing temperatures of the light source 109 obtained using the temperature detector 113, and the operation is performed in accordance with the flowchart of FIGS. 11A and 11B.

In this case, in step S1102 of FIG. 11A, the controller 101 determines whether a temperature T of the light source 109 obtained using the temperature detector 113 is lower than a stop temperature T1 representing a certain temperature of the projector which has been stopped. In this way, it can be presumed whether the light scarce 109 of the projector can be immediately turned on with full brightness.

Furthermore, in this case, in step S1106 of FIG. 11A, the controller 101 determines whether the temperature T of the light source 109 obtained using the temperature detector 113 is larger than a floating operation temperature AT2 representing a certain temperature of the projector in the floating operation. In this way, a determination as to whether the floating operation has been performed for a sufficient period of time can be made.

Similarly, in this case, the controller 101 determines whether the temperature T of the light source 109 obtained using the temperature detector 113 is higher than certain temperatures of step S1109, step S1111, step S1113, step S1121, and step S1124 in respective step S1109, step S1111, step S1113, step S1121, and step S1124 of FIG. 11A. In this way, a determination as to whether the state of brightness of the light source 109 has reached a predetermined state can be made.

Alternatively, the timer 114 may be used to determine whether the floating operation and the dispersing operation are sufficiently performed.

Furthermore, the operation of the flowchart of FIGS. 11A and 11B may be performed by presuming the state of the light source 109 in accordance with information on light quantity of the light source 109 obtained using the light sensor 115.

In this case, in step S1102 of FIG. 11A, the controller 101 determines whether a light quantity P obtained using the light sensor 115 is smaller than a stop light quantity P1 representing a certain light quantity of the projector which has been stopped. In this way, it can be presumed whether the light source 109 of the projector can be immediately turned on with full brightness.

Furthermore, in this case, in step S1106 of FIG. 11A, the controller 101 determines whether the light quantity P obtained using the light sensor 115 is larger than a floating operation light quantity AP1 representing a certain light quantity in the floating operation. In this way, a determination as to whether the floating operation is performed for a sufficient period of time can be made.

Similarly, in this case, the controller 101 determines whether the light quantity P obtained using the light sensor 115 is larger than certain light quantities of step S1109, step S1111, step S1113, step S1121, and step S1124 of FIG. 11A. In this way, a determination as to whether the state of brightness of the light source 109 has reached a predetermined state can be made.

Alternatively, the timer 114 may be used to determine whether the floating operation and the dispersing operation are sufficiently performed.

Furthermore, the state of the light source 109 may be presumed taking a combination of the information obtained using the temperature detector 113, the information obtained using the timer 114, and the information obtained using the light sensor 115 into consideration.

Moreover, the light sensor 115 may measure light quantity or light flux.

In this exemplary embodiment, the description is made assuming that constant voltages of certain levels are to be applied to the transparent electrode layer 203 and constant voltages of certain levels are to be applied to the reflection pixel electrode layer 207. However, the voltages may be irregularly varied or the voltages may be AC voltages. In this exemplary embodiment, the electric fields to be applied to the liquid crystal layer 205 are controlled by controlling the potential difference between the transparent electrode layer 203 and the reflection pixel electrode layer 207. Accordingly, the constant voltages are not necessarily used.

Furthermore, in the liquid crystal element, the charged particles may be combined with charges having polarities opposite to those included in the liquid crystal when the liquid crystal element is driven. The charged particles combined with the charges having the opposite polarities are brought to neutral states due to the combined charges. Even when the electric fields are applied to such charged particles in order to perform the floating operation and the dispersing operation, the coulomb force does not work, and therefore, the charged particles are not floated and not dispersed.

By leaving the liquid crystal element for a long period of time without being driven, the charged particles in the neutral states return to the charged particles in an original state after the combinations with the charges having the opposite polarities are cancelled by themselves. In this state, the charged particles have been negatively charged.

In this exemplary embodiment, a determination as to whether the floating operation is to be performed and a determination as to whether the dispersing operation is to be performed are made in accordance with states of the charged particles in the liquid crystal element. By this, the floating operation or the dispersing operation can be performed when the charged particles can be effectively floated or dispersed.

Specifically, the controller 101 controls the liquid crystal driving unit 107 so that the floating operation and the dispersing operation are performed when the charged particles in the liquid crystal element are not combined with the charges having the polarities opposite to those in the liquid crystal whereas the floating operation and the dispersing operation are not performed when the charged particles are combined with the charges having the polarities opposite to those in the liquid crystal.

A method for presuming the state of the charged particles 501 in the liquid crystal element will now be described.

As described above, by leaving the liquid crystal element for a long period of time without being driven, the charged particles in the neutral states return to the charged particles in the original state after the combinations with the charges having opposite polarities are cancelled by themselves.

Therefore, if a determination as to whether the liquid crystal element has not been driven for a long period of time can be made, the state of the charged particles included in the liquid crystal element can be presumed.

In this exemplary embodiment, it is determined whether the liquid crystal element has not been driven for a long period of time in accordance with a temperature of the liquid crystal element, a temperature of the light source 109, a period of time from when the power is turned off to when the power is turned on, and quantity of light (light flux) emitted from the light source 109.

In a case where it is determined whether the liquid crystal element has not been driven for a long period of time in accordance with the temperature of the liquid crystal element, the temperature detector 113 detects the temperature of the liquid crystal element. When the temperature detected by the temperature detector 113 is higher than a predetermined value, the controller 101 determines that the liquid crystal element is not in the state in which the liquid crystal element has not been driven for a long period of time whereas when the temperature detected by the temperature detector 113 is lower than the predetermined value, the controller 101 determines that the liquid crystal element is in the state in which the liquid crystal element has not been driven for a long period of time. In this case, the predetermined value corresponds to approximately 25° C. or approximately 20° C., for example.

In a case where it is determined whether the liquid crystal element has not been driven for a long period of time in accordance with the temperature of the liquid crystal element, the temperature detector 113 detects the temperature of the light source 109. When the temperature detected by the temperature detector 113 is higher than a predetermined value, the controller 101 determines that the liquid crystal element is not in the state in which the liquid crystal element has not been driven for a long period of time whereas when the temperature detected by the temperature detector 113 is lower than the predetermined value, the controller 101 determines that the liquid crystal element is in the state in which the liquid crystal element has not been driven for a long period of time. In this case, the predetermined value corresponds to approximately 25° C. or approximately 20° C., for example.

In a case where it is determined whether the liquid crystal element has not been driven for a long period of time in accordance with the period of time from when the power is turned off to when the power is turned on, the timer 114 detects the period of time. The timer 114 measures the period of time from, when the power is turned off to when the power is turned on. When information on the period of time measured by the timer 114 is larger than a predetermined value, the controller 101 determines that the liquid crystal element is in the state in which the liquid crystal element has not been driven for a long period of time whereas when the information of the period of time measured by the timer 114 is smaller than the predetermined value, the controller 101 determines that the liquid crystal element is not in the state in which the liquid crystal element has not been driven for a long period of time. In this case, the predetermined value corresponds to approximately 100 hours or approximately 200 hours, for example.

In a case where it is determined, whether the liquid crystal element has not been driven for a long period of time in accordance with the quantity of light (light flux) emitted from the light source 109, the light sensor 115 detects the light quantity or the light flux. When the light quantity obtained by the light sensor 115 is smaller than a predetermined value, the controller 101 determines that the liquid crystal element is in the state in which the liquid crystal element has not been driven for a long period of time whereas when the light quantity obtained by the light sensor 115 is larger than the predetermined value, the controller 101 determines that the liquid crystal element is not in the state in which the liquid crystal element has not been driven for a long period of time.

The determination as to whether the liquid crystal element has not been driven for a long period of time is made as described above.

The control of the floating operation and the dispersing operation performed by the projector of this exemplary embodiment will now be described. FIG. 16 is a flowchart illustrating the control of the floating operation and the dispersing operation.

In step S1601, the controller 101 instructs the power supply unit 104 to supply the electric power to the blocks in accordance with an instruction on power-on issued by the operation unit 103.

After the electric power is supplied to the blocks, the controller 101 determines whether the liquid crystal element has not been driven for a long period of time in step S1602.

When the determination is negative in step S1602, the controller 101 instructs the liquid crystal driving unit 107 to normally operate the liquid crystal unit 108 in step S1608.

On the other hand, when the determination is affirmative in step S1602, the controller 101 instructs the liquid crystal driving unit 107 to perform the floating operation in step S1603.

Thereafter, the controller 101 successively receives information blocks regarding periods of times measured by the timer 114, and determines whether the time t representing the period of time from when the power is turned on to a current time is equal to or larger than the floating operation time At2 in step S1604. When the determination is affirmative in step S1604, the controller 101 instructs the liquid crystal driving unit 107 to perform the dispersing operation in step S1605.

In step S1606, the controller 101 successively receives information blocks regarding periods of times measured by the timer 114, and determines whether the time t representing the period of time from when the power is turned on to a current time is equal to or larger than the dispersing operation time t2 representing a certain time in the dispersing operation (20 seconds after the power is turned on).

When the determination is affirmative in step S1606, the controller 101 instructs the liquid crystal driving unit 107 to stop the dispersing operation in step S1607. Then, the controller 101 instructs the liquid crystal driving unit 107 to normally operate the liquid crystal unit 105 in step S1608.

Then, the user uses the projector in the normal usage.

After a normal image is projected, the controller 101 instructs the power supply unit 104 to supply the electric power to the blocks of the projector in accordance with an instruction on power-off issued by the operation unit 103 in step S1609.

By this, in accordance with the state of the charged particles 501 in the liquid crystal element, the projector of this exemplary embodiment performs the floating operation or the dispersing operation when the charged particles 501 can be effectively floated or dispersed.

In this exemplary embodiment, the determination as to whether the liquid crystal element has not been driven for a long period of time may be made taking a combination of information obtained using the temperature detector 113, information obtained using the timer 114, and information obtained using the light sensor 115 into consideration. That is, the state of the charged particles 501 in the liquid crystal element may be presumed taking a combination of the information obtained using the temperature detector 113, the information obtained using the timer 114, and the information obtained using the light sensor 115 into consideration.

In this exemplary embodiment, the description is made taking the projector as an example. However, the present invention is applicable to any display device having such a liquid crystal element, such as a liquid crystal television set, a liquid crystal display device, a digital still camera, a portable game machine, and a cellular phone, for example.

This exemplary embodiment is applicable to the liquid crystal modulation element in the vertical alignment nematic (VAN) mode. However, the operation of controlling the applied voltages may be modified so as to be suitable for liquid crystal modulation elements, of a TN mode, an STN (Super Twist Nematic) mode, and an OCB (Optically Compensated Birefringence) mode, and may be applied to these liquid crystal modulation elements. Furthermore, the operation of controlling the applied voltages may be modified so as to be suitable for transmissive liquid crystal modulation element.

It is apparent that an object of the present invention is realized by supplying a storage medium including program code of software which attains the functions of the exemplary embodiment to a device. In this case, a computer (a CPU or a MPU) serving as a controller of the device which received the storage medium reads and executes the program code stored in the storage medium.

In this case, the program code read from the storage medium realizes the functions of the exemplary embodiment described above, and therefore, the program code itself and the storage medium including the program code stored therein are included in the present invention.

Examples of the storage medium used to supply the program code include a flexible disk, a hard disk, an optical disc, a magneto-optical disc, a CD-ROM (Compact Disc Read-Only Memory), a CD-R (Compact Disc Readable), a magnetic tape, a nonvolatile memory card, and a ROM.

It is apparent that a case where an OS (Operating System), i.e., a basic system which operates in the device performs part of or entire processing, and the functions of the exemplary embodiment are realized in accordance with the processing is included in the present invention.

Furthermore, it is apparent that a case where the program code read from the storage medium is written to a memory included in a function expansion board inserted into the device or a memory included in a function expansion unit connected to the computer so that the functions of the exemplary embodiment are realized is included in the present invention. Here, a CPU included in the function expansion board or a CPU included in the function expansion unit performs part of or entire processing in accordance with instructions represented by the program code.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. A display apparatus comprising:
a liquid crystal panel;
a light source configured to supply light to the liquid crystal panel; and
a control unit configured to (a) perform a first process for applying to a liquid crystal layer of the liquid crystal panel a voltage for spreading particles included in the liquid crystal layer before an image is projected to a screen since the display apparatus is turned on and (b) perform, using the light source and the liquid crystal panel, a second process for projecting an image to the screen after the first process is performed.

2. The liquid crystal display apparatus according to claim 1, wherein the first process includes a process for causing particles included in the liquid crystal layer to float.

3. The liquid crystal display apparatus according to claim 1, wherein the first process includes a process for causing particles included in the liquid crystal layer to disperse.

4. The display apparatus according to claim 1, wherein the control unit causes the light source to supply light to the liquid crystal panel if the display apparatus is turned on.

5. The display apparatus according to claim 1, wherein the first process includes a process for applying a first voltage to a first electrode of the liquid crystal layer and a process for applying a second voltage, that is less than the first voltage, to a second electrode of the liquid crystal layer.

6. The display apparatus according to claim 5, wherein the first process includes a process for applying a third voltage to the first electrode and a process for applying a fourth voltage, that is more than the third voltage, to the second electrode.

7. The display apparatus according to claim 1, wherein the first process includes a process for applying a third voltage to a first electrode of the liquid crystal layer and a process for applying a fourth voltage, that is more than the third voltage, to a second electrode of the liquid crystal layer.

8. The display apparatus according to claim 1, wherein the display apparatus includes a camera.

9. The display apparatus according to claim 1, wherein the display apparatus includes a projector.

10. A method for controlling a display apparatus, wherein the display apparatus includes a liquid crystal panel and a light source configured to supply light to the liquid crystal panel, comprising:
performing a first process for applying to a liquid crystal layer of the liquid crystal panel a voltage for spreading particles included in the liquid crystal layer before an image is projected to a screen since the display apparatus is turned on; and
performing, using the light source and the liquid crystal panel, a second process for projecting an image to the screen after the first process is performed.

11. The display apparatus according to claim 10, wherein the display apparatus includes a cellular phone.

12. A display apparatus comprising:
a liquid crystal panel;
a light source configured to supply light to the liquid crystal panel; and
a control unit configured to (a) perform a first process for applying to a liquid crystal layer of the liquid crystal panel a voltage for decreasing an influence of particles, which have been deposited in a place, included in the liquid crystal layer, before an image is projected to a screen since the display apparatus is turned on, and (b) perform, using the light source and the liquid crystal panel, a second process for projecting an image to the screen after the first process is performed.

13. The display apparatus according to claim 12, wherein the first process includes a process for causing particles included in the liquid crystal layer to float.

14. The display apparatus according to claim 12, wherein the first process includes a process for causing particles included in the liquid crystal layer to disperse.

15. The display apparatus according to claim 12, wherein the control unit causes the light source to supply light to the liquid crystal panel if the display apparatus is turned on.

16. The display apparatus according to claim 12, wherein the first process includes a process for applying a first voltage to a first electrode of the liquid crystal layer and a process for applying a second voltage, that is less than the first voltage, to a second electrode of the liquid crystal layer.

17. The display apparatus according to claim 16, wherein the first process includes a process for applying a third voltage to the first electrode and a process for applying a fourth voltage, that is more than the third voltage, to the second electrode.

18. The display apparatus according to claim 12, wherein the first process includes a process for applying a third voltage to a first electrode of the liquid crystal layer and a process for applying a fourth voltage, that is more than the third voltage, to a second electrode of the liquid crystal layer.

19. The display apparatus according to claim 12, wherein the display apparatus includes a camera.

20. The display apparatus according to claim 12, wherein the display apparatus includes a projector.

21. The display apparatus according to claim 12, wherein the display apparatus includes a cellular phone.

22. A method for controlling a display apparatus, wherein the display apparatus includes a liquid crystal panel and a light source configured to supply light to the liquid crystal panel, comprising:
performing a first process for applying to a liquid crystal layer of the liquid crystal panel a voltage for decreasing an influence of particles, which have been deposited in a place, included in the liquid crystal layer, before an image is projected to a screen since the display apparatus is turned on; and
performing, using the light source and the liquid crystal panel, a second process for projecting an image to the screen after the first process is performed.

* * * * *